United States Patent
Miedema

(10) Patent No.: US 11,356,325 B1
(45) Date of Patent: Jun. 7, 2022

(54) ACCELERATING TRANSACTIONS FROM A TRUSTED SOURCE

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/099,908

(22) Filed: Nov. 17, 2020

(51) Int. Cl.
| H04L 41/082 | (2022.01) |
| H04L 67/60 | (2022.01) |
| G06F 8/658 | (2018.01) |
| H04L 41/00 | (2022.01) |
| G06F 16/23 | (2019.01) |
| G06F 16/176 | (2019.01) |

(52) U.S. Cl.
CPC ............ H04L 41/082 (2013.01); G06F 8/658 (2018.02); G06F 16/1767 (2019.01); G06F 16/2308 (2019.01); G06F 16/2379 (2019.01); H04L 41/20 (2013.01); H04L 67/32 (2013.01)

(58) Field of Classification Search
CPC ....... H04L 41/082; H04L 41/20; H04L 67/32; G06F 16/1767; G06F 16/2308; G06F 16/2315; G06F 16/2379; G06F 8/658
See application file for complete search history.

(56) References Cited

U.S. PATENT DOCUMENTS

| 7,473,858 | B1 | 1/2009 | Berndt et al. |
| 7,995,569 | B2 | 8/2011 | Ashwood-Smith et al. |
| 8,364,036 | B2 | 1/2013 | Boertjes et al. |
| 8,725,882 | B2 * | 5/2014 | Neel .................. H04L 67/42 709/227 |
| 9,060,215 | B2 | 6/2015 | Miedema |
| 9,258,190 | B2 | 2/2016 | Swinkels et al. |
| 9,485,013 | B2 | 11/2016 | Al Sayeed et al. |
| 9,686,176 | B2 | 6/2017 | Traxler et al. |
| 9,734,190 | B1 * | 8/2017 | Holenstein .......... G06F 16/2365 |
| 9,760,598 | B1 | 9/2017 | Holenstain et al. |
| 9,819,565 | B2 | 11/2017 | Djukic et al. |
| 10,257,596 | B2 | 4/2019 | Swinkels et al. |
| 10,440,128 | B2 | 10/2019 | Miedema |
| 10,455,300 | B2 | 10/2019 | Swinkels et al. |

(Continued)

OTHER PUBLICATIONS

Feb. 22, 2022, International Search Report and Written Opinion for International Application No. PCT/US2021/058700.

*Primary Examiner* — Nam T Tran
(74) *Attorney, Agent, or Firm* — Clements Bernard Baratta; Lawrence A. Baratta, Jr.; Christopher L. Bernard

(57) ABSTRACT

Systems, methods, and computer-readable media for accelerating a transaction from a trusted source are provided. A method, according to one implementation, includes the step of obtaining a transaction to be processed in a network. The transaction may include one or more changes to data records stored in a database. The method also includes determining whether the transaction is obtained from a trusted source, where the trusted source may be predefined as a device that knows the state of components in the network. When the transaction is obtained from a trusted source, the method includes the step of committing the one or more changes prior to checking the validity of the one or more changes. When the transaction is not obtained from a trusted source, the method includes the step of checking the validity of the one or more changes prior to committing the one or more changes.

20 Claims, 5 Drawing Sheets

(56) References Cited

U.S. PATENT DOCUMENTS

| | | |
|---|---|---|
| 10,680,739 B2 | 6/2020 | Swinkels et al. |
| 10,735,837 B1 | 8/2020 | Al Sayeed et al. |
| 10,797,818 B1 | 10/2020 | Croskery et al. |
| 2006/0136516 A1* | 6/2006 | Jain .................... G06F 16/1774 |
| 2014/0289187 A1* | 9/2014 | Fuchs .................... G06F 16/23 |
| | | 707/609 |
| 2019/0073676 A1* | 3/2019 | Wang ................. G06Q 20/4016 |
| 2019/0179930 A1* | 6/2019 | Vandiver ............. G06F 16/2365 |
| 2019/0179939 A1* | 6/2019 | Govindarajan ..... G06F 16/2315 |
| 2019/0349262 A1 | 11/2019 | Miedema et al. |

* cited by examiner

ACCELERATING TRANSACTIONS FROM A TRUSTED SOURCE

TECHNICAL FIELD

The present disclosure generally relates to networking systems and methods. More particularly, the present disclosure relates to distributed microservice architectures in which transactions from a trusted source are processed in an accelerated manner.

BACKGROUND

Generally, in a distributed microservice architecture where multiple services can actively participate on a network, transactions may be initiated by any of the services. For example, some transactions may include processing data and changing the fields of different databases. One issue that should be addressed in such a system is a process known as concurrency, whereby two users may obtain data elements from the same database and attempt to write new values for the data elements at about the same time. In this case, one set of updated data may be overwritten. Thus, concurrency can cause data elements to be invalid.

For example, suppose that two users are running an application and want to edit two fields of the same record in a database. One user may change the first field and the other user may change the second field. If the second user submits the data changes after the first user, the changes by the second user may be able to save the changes but may also overwrite the old values of unchanged data into the first field. This is a concurrency problem that may be solved by an Optimistic Concurrency solution or a Pessimistic Concurrency solution. Optimistic Concurrency does not stop concurrency conflicts from happening but relies on the belief that conflicts will be rare or not happen at all. However, if there are conflicts, the system may have solutions for resolving the conflicts. The solution with respect to Pessimistic Concurrency is based on the assumption that concurrency conflicts may happen regularly and therefore includes "locking" the records of a database by allowing access only in a read-only manner. Only after the database is unlocked can data records be written. Thus, managing data with the Pessimistic Concurrency approach may typically be more complex.

With Pessimistic Concurrency, data is locked, the transaction is processed to completion, and the data is then unlocked. This lock can be a full datastore lock, a per service lock, or a partial lock specified by the user. Transaction processing also includes a "commit" step, which does not occur until the full transaction has been processed. Clients are blocked until the transaction is complete, and there is no control over processing speed. Pessimistic Concurrency involves locking databases and processing the transaction to completion before returning to the client.

Referring again to Optimistic Concurrency, a starting point is noted when the transaction begins, but no lock is obtained. "Validation" and "staging" steps occur while the data is unlocked. When the "commit" step occurs, the system can detect if any of the changed elements have been modified by the system since the transaction started and, if so, the transaction is rebased (i.e., established as a new base level) to the new starting point and reattempted. The rebase steps and reattempts can take an indeterminate amount of time in a busy system and the client normally does not have any control over the scope or timing. Optimistic Concurrency involves rebasing and reattempting until the transaction is completed before returning to the client.

Although the Pessimistic Concurrency and Optimistic Concurrency processes are able to sufficiently avoid concurrency issues, they do not allow clients to control how the steps are processed in a transaction. As a result, each transaction typical runs through a number of steps, which can add time to the overall network processing. Therefore, there is a need in the field of optical networking systems and distributed microservice networks to accelerate the overall processing times.

BRIEF SUMMARY

The present disclosure is directed to systems and methods for enabling an accelerated process of handling a transaction within a network when the transaction is obtained from a trusted or reliable source. According to one embodiment, a method may include the step of obtaining a transaction to be processed in a network, where the transaction may include one or more changes to data records stored in a database. The method also includes determining whether the transaction is obtained from a trusted source, whereby the trusted source may be predefined as a device that knows the state of components in the network. When the transaction is obtained from the trusted source, the method includes the step of committing the one or more changes prior to checking validity of the one or more changes. When the transaction is not obtained from the trusted source, the method includes the step of checking the validity of the one or more changes prior to committing the one or more changes.

According to another embodiment of the present disclosure, a non-transitory computer-readable medium may be configured to store computer logic having instructions enabling a processing device to obtain a transaction to be processed in a network. The transaction may include one or more changes to data records stored in a database. The instructions further enable the processing device to determine whether the transaction is obtained from a trusted source, whereby the trusted source may be predefined as a device that knows the state of components in the network. When the transaction is obtained from the trusted source, the processing device is configured to commit the one or more changes prior to checking validity of the one or more changes. When the transaction is not obtained from the trusted source, the processing device is configured to check the validity of the one or more changes prior to committing the one or more changes.

According to yet another embodiment of the present disclosure, a system is provided which includes a processing device and a memory device. The memory device may be configured to store a computer program having instructions that, when executed, cause the processing device to obtain a transaction to be processed in a network. For example, the transaction may include one or more changes to data records stored in a database. The instructions allow cause the processing device to determine whether the transaction is obtained from a trusted source. When the transaction is obtained from the trusted source, the instructions may further cause the processing device to commit the one or more changes prior to checking validity of the one or more changes. When the transaction is not obtained from the trusted source, the instructions may cause the processing device to check the validity of the one or more changes prior to committing the one or more changes.

BRIEF DESCRIPTION OF THE DRAWINGS

The present disclosure is illustrated and described herein with reference to the various drawings. Like reference

DETAILED DESCRIPTION

Figure 1:
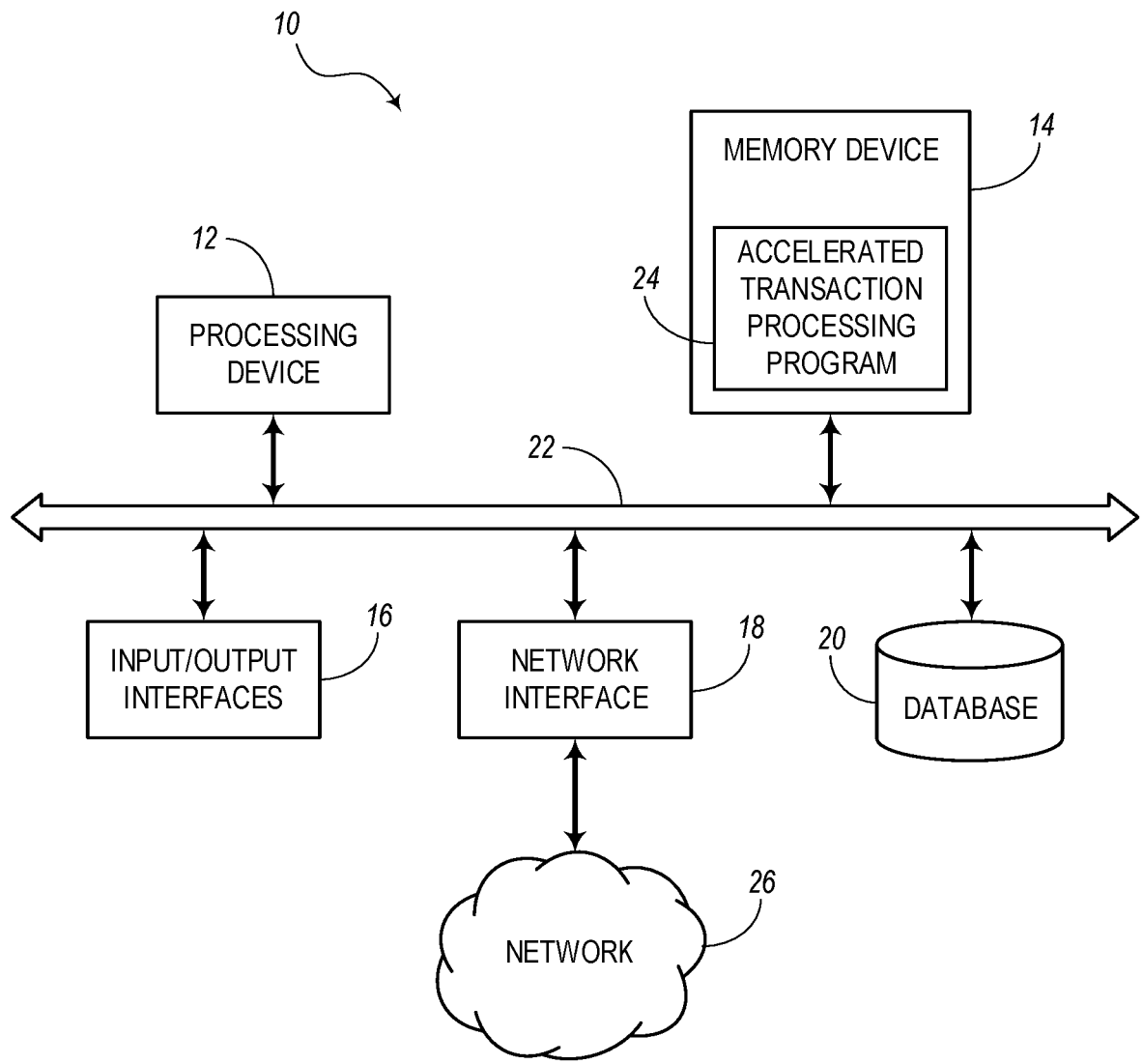
FIG. 1 is a block diagram illustrating a computer system for enacting a process to accelerate transactions from a trusted source, according to various embodiments.

The present disclosure relates to systems and methods for accelerating the processing time for handling transactions in a distributed microservice architecture. In particular, the embodiments of the present disclosure include checking to determine if a new transaction is initiated by a "trusted" source. If so, the transaction can be expedited. For example, instead of performing a normal sequence of steps for executing a transaction according to conventional systems, the present disclosure is directed to performing steps in a new sequence. Particularly, instead of performing a "commit" step after "staging" and "validation" steps, the present disclosure includes embodiments where a commit step is executed first, followed by staging and validation steps. Thus, the commit step precedes the staging and validation.

A trusted source may be any client device, node, server, etc. that has been identified upfront as a reliable source that knows the state of all or most of the components of a network. The trusted source may also have control functionality and may be configured in a control plane of the network. To determine whether a source can be trusted, the network may include an identification strategy for tagging the trusted source. Then, when a transaction request is received from the trusted source, this tag may be used to identify the source as legitimately reliable. For instance, the devices of the network may be configured to check a specific argument in the transaction that signals trust. Since a trusted source may be described as a source that will be reliable a large majority of the time, the steps of the transaction can be rearranged in a certain way (i.e., performing a commit step before staging or validation steps) to allow processes throughout the network to continue after "commit." However, in the rare occurrence that an error is detected with the reliable or trusted source, steps can be rolled back to undo certain processes as needed. Typically, in a computer processing environment, a "commit" step includes the making of a set of tentative changes permanent. Thus, the commit usually marks the end of the entire transaction.

A microservice architecture may include a structure like a Service Oriented Architecture (SOA) and may be configured to include one or more applications for performing various services. These services may be communicated over a network using technology-agnostic protocols and may implement different databases, hardware, software, and programming languages. Services may be represented as various business functionalities each with independent interfaces and components, implemented in a layered architecture and individually scalable.

In a computer environment, the action of processing data in a network includes dividing tasks into individual, indivisible operations called "transactions." Each transaction as a whole either succeeds or fails as a complete unit and cannot be completed only partially. For example, a computer transaction in some ways may be viewed as being similar to a financial transaction where an exchange of money for a product or service is only completed when all parts of the transaction are successful, that is, when the money is transferred from a buyer to the seller and when the product/service is provided from the seller to the buyer.

Transaction processing systems consist of computer hardware and software performing transactions for conducting business. Intermediate states of a database can be recorded as the data is being modified. Using these data records, it may be possible to restore the database to a known state. Typically, restoration occurs if it is determined that a transaction cannot be committed. However, according to the embodiments described in the present disclosure, transactions are allowed to perform a commit process early and then restore later if necessary. In an example of restoration, copies of information on the database prior to its modification by a transaction are set aside by the system before the transaction can permanently make any modifications. If any part of a transaction fails, these copies are used to restore the database to the state it was in before the transaction began. Conventional systems perform multiple steps before determining if the transaction can be committed and may then rollback if the transaction encounters an error. On the other hand, the embodiments of the present disclosure perform the commit step early in the process to allow the network to continue operating, but then may rollback at a later time if necessary.

The "staging" action may include the use of a staging area, which may include one or more intermediate storage areas (e.g., data repositories, data stores, databases, or other suitable memory or data storage devices) used for data processing during the transaction. The staging area may reside between a data source and a target. Staging areas are typically transient in nature, whereby the stored data may be erased and written before, during, and after the processing of transactions. Also, some staging areas may be configured to store data for longer periods of time when needed for archival or troubleshooting purposes.

In a distributed microservice architecture, the scope of a declarative transaction may include many services. The scope of the services involved can change as services add changes to a transaction via staging. The validation of the transaction can also be quite involved and inefficient as this scope changes. The scope and work required to collect the data, perform a difference step ("diff"), lock services involved, stage the data, validate it, commit it, publish changes, and unlock is outside the control of the client.

This can result in unpredictable timing between a client requesting an operation and it being implemented on the device. For time critical functions, it can be beneficial to have an alternative "optimistic" transaction model that can succeed quickly if the data is correct but still have the ability to stage the data and detect invalid data. The present disclosure is configured to reorder the phases of a transaction to allow trusted sources to have the benefit of the doubt and implement the changes quickly and be notified of errors after the changes have been rolled back.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a computer system 10 (e.g., transaction computer) for initiating and performing transactions within a network 26 (e.g., distributed microservice network). For example, the computer system 10 may be a server, Network Management System (NMS), a Software Defined Networking (SDN) controller, or other suitable control device. The computer system 10 may be implemented in a control plane of a network system (e.g., network 26).

In the illustrated embodiment, the computer system 10 may be a digital computer that, in terms of hardware architecture, generally includes a processing device 12, a memory device 14, Input/Output (I/O) interfaces 16, a network interface 18, and a database 20. The memory device 14 may include a data store, database (e.g., database 20), or the like. It should be appreciated by those of ordinary skill in the art that FIG. 1 depicts the computer system 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a Central Processing Unit (CPU), an auxiliary processor among several processors associated with the computer system 10, a semiconductor-based microprocessor (in the form of a microchip or chip set), or generally any device for executing software instructions. When the computer system 10 is in operation, the processing device 12 may be configured to execute software stored within the memory device 14, to communicate data to and from the memory device 14, and to generally control operations of the computer system 10 pursuant to the software instructions.

It will be appreciated that some embodiments of the processing device 12 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 18 may be used to enable the computer system 10 to communicate over a network, such as the network 26, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10GbE) or a Wireless LAN (WLAN) card or adapter (e.g., 802.11a/b/g/n/ac). The network interface 18 may include address, control, and/or data connections to enable appropriate communications on the network 26.

The memory device 14 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the computer system 10 and may include, for example, an internal hard drive connected to the local interface 22 in the computer system 10. Additionally, in another embodiment, the data store may be located external to the computer system 10 and may include, for example, an external hard drive connected to the Input/Output (I/O) interfaces 16 (e.g., SCSI or USB connection). In a further embodiment, the data store may be connected to the computer system 10 through a network (e.g., network 26) and may include, for example, a network attached file server.

Moreover, some embodiments may include a non-transitory computer-readable storage medium having computer readable code stored in the memory device 14 for programming the computer system 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

The memory device 14 may be configured to store a computer program for enabling the accelerated processing of transactions according to the various embodiments of the present disclosure. For example, the memory device 14 may store an accelerated transaction processing program 24, which is configured to enable the processing device 12 to perform various functions to accelerate the processing of transactions in a network (e.g., network 26). More particularly, the transaction steps may be accelerated by rearranging the order of steps of a conventional process, such as by performing a "commit" step before "staging" and/or "validation" steps.

Advantageously, the present disclosure provides the ability for a client to control the behavioral model of the transaction to allow for provisioning in a system, which has been pre-validated, to be processed immediately. The staging and validation steps may then be performed after the commit step.

First Transaction Process

Steps/phases of a transaction process may include:
Lock services involved
Get current state
Locally apply changes to current state to determine "destination"
Generate patches needed to go from current state to destination
Stage these patches recursively to allow services to add data to the transaction
 For staged data, lock newly introduced services
 Get current state for these services
 Apply staged patches with original changes
 . . . until staging produces no new results
For all patches (staged and original)
 Validate they are correct
Commit or discard
Publish changes if committed
Notify all services that the transaction is complete
Unlock all services It can be noted that the above process of handling transaction, which may be similar to conventional processes, involves much processing that can occur between the start of the transaction and the "commit" phase. This processing can be non-deterministic based on the request, the current state of the system, and the services participating in the transaction.

According to novel transaction processing described below, the steps can be performed in a way that is advantageous over conventional processing in that the network allows the devices to process the transactions quicker. For example, if a client device is well designed and is in-synch with a current state of the system, there can be an "express path" that assumes the data is complete and correct. Thus, the network devices can be committed first and then rollback if errors are detected. It may be noted that the following transaction processing strategies still involve the step of locking the related services to avoid datastores changing "under the client's feet."

Second Transaction Process

A synchronous transaction process initiated by a trusted source may include the following steps/phases in a success path of the network:
Lock services involved
Detect if this is a trusted transaction
"Commit" changes and get required "undo" patches needed to undo later
Get current state
Locally apply "undo" changes to current state to determine "source"
Generate patches needed to go from source state to current state
Stage these patches recursively to allow services to add data to the transaction
 For staged data, lock newly introduced services
 Get current state for these services
 Apply staged patches with original changes
 . . . until staging produces no new results
For all patches (staged and original)
 Validate they are correct
For all staged patches
 Commit or discard
For all patches (staged and original)
 Publish changes if committed
 Notify all services that the transaction is complete
Unlock all services It may be noted that while the data is committed quickly, and staging, validation, and other steps are performed after the committing, the client may still be blocked while the post processing is happening.

Third Transaction Process

In an alternative asynchronous embodiment, results may be broken up so the client can return to processing. Thus, the steps/phases of an asynchronous trusted transaction processing in a success path may include:
Lock services involved
Detect if this is a trusted transaction
"Commit" changes and get required "undo" patches needed to undo later
Return true with a correlation tag for the transaction to be used if a rollback occurs
Start new thread to continue processing while locked
 Get current state Locally apply "undo" changes to current state to determine "source"

Generate patches needed to go from source state to current state

Stage these patches recursively to allow services to add data to the transaction For staged data, lock newly introduced services Get current state for these services Apply staged patches with original changes . . . until staging produces no new results For all patches (staged and original)

Validate they are correct

For all staged patches

Commit or discard

For all patches (staged and original)

Publish changes if committed

Notify all services that the transaction is complete

Unlock all services

The second and third transaction processes include examples of processing over a success path showing a normal flow when things are processed as expected.

Fourth Transaction Process

For cases where a problem is detected along the way and the client needs to be informed of the rollback, a notification mechanism is needed. This extra processing is shown for the synchronous model for simplicity but could apply to the asynchronous case as well. The steps/phases of a synchronous trusted transaction processing in a failure path may include:

Lock services involved

Detect if this is a trusted transaction

Commit changes and get required "undo" patches needed to undo later

Get current state

Locally apply "undo" changes to current state to determine "source"

Generate patches needed to go from source state to current state

Stage these patches recursively to allow services to add data to the transaction For staged data, lock newly introduced services Get current state for these services Apply staged patches with original changes . . . until staging produces no new results For all patches (staged and original)

Validate they are correct

When a failure is detected

Client is notified with the correlation tag that the transaction was aborted

Notify all services that the transaction is discarded

Unlock all services

Note that although the client can be released early while the transaction is ongoing, the locked services may prevent or delay an additional request from the client device (or other network device) while the original is being processed. It is best if the transaction can be bulked so that the post-processing does not delay a subsequent set of changes. Also, these additional steps/phases can be combined with a Pessimistic Concurrency model (with full or partial locking) and/or an Optimistic Concurrency model.

Figure 2A:
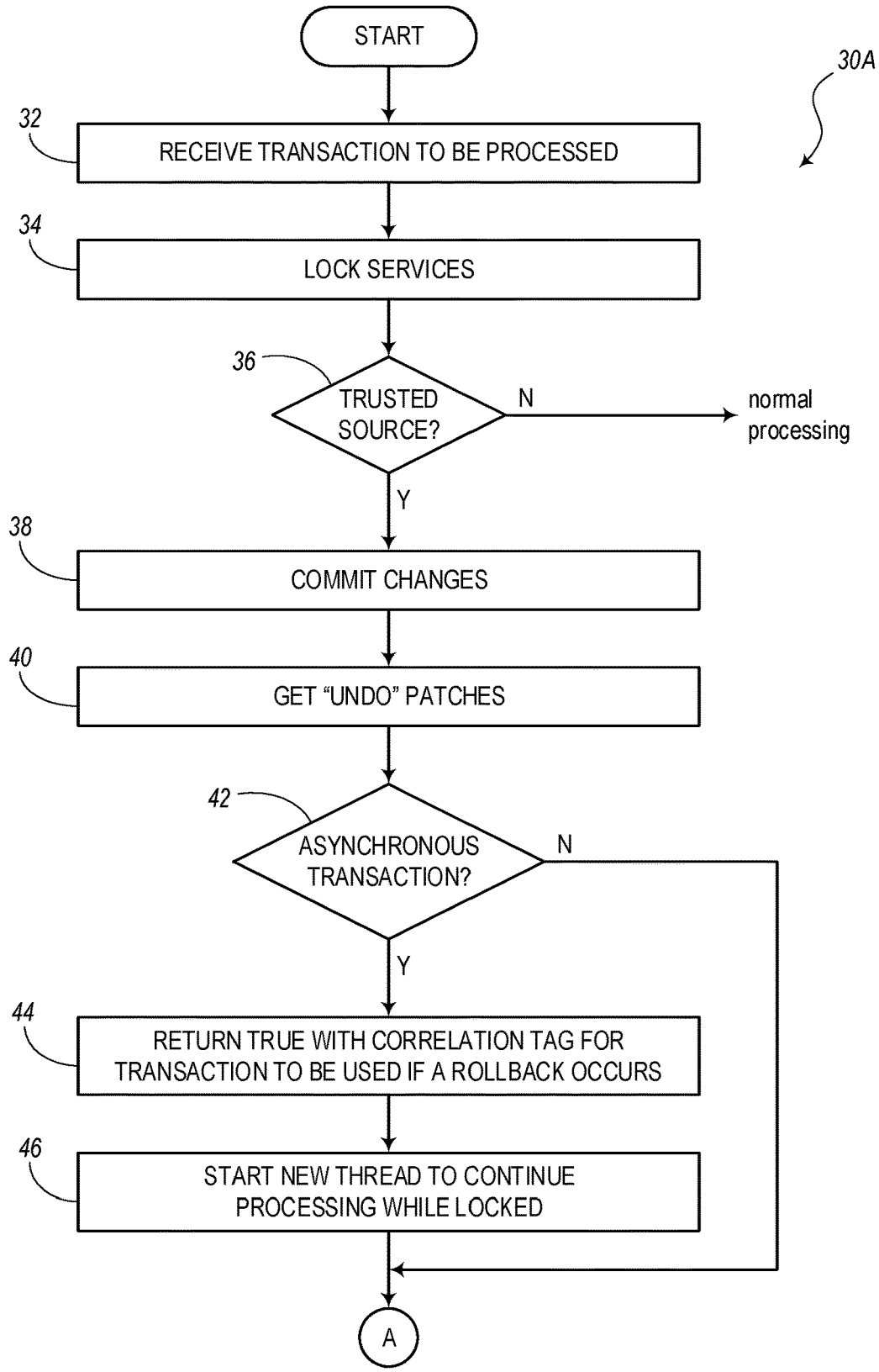
FIGS. 2A-2C, in combination, are a flow diagram illustrating a process for accelerating transactions, according to various embodiments.
Figure 2B:
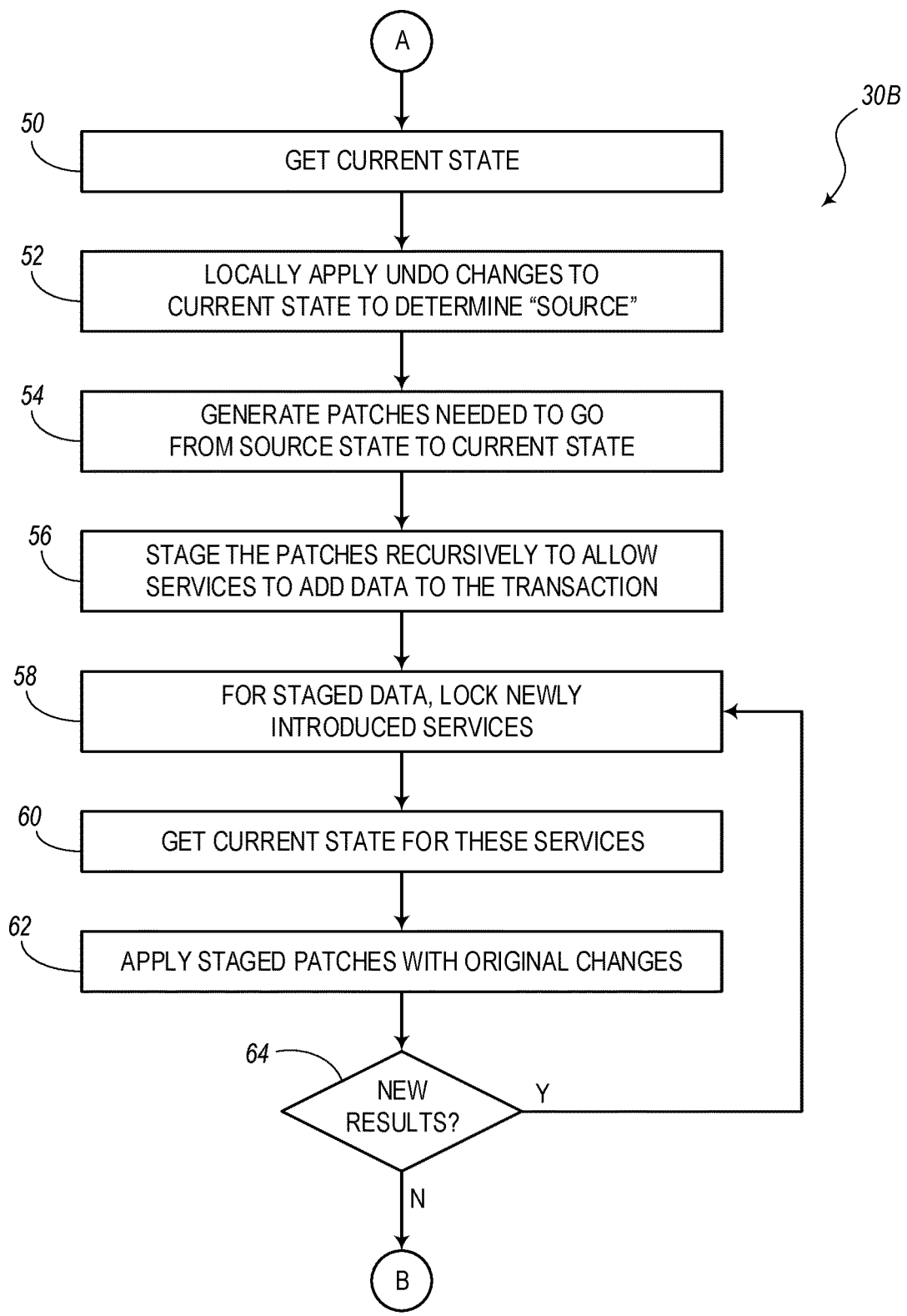
Figure 2C:
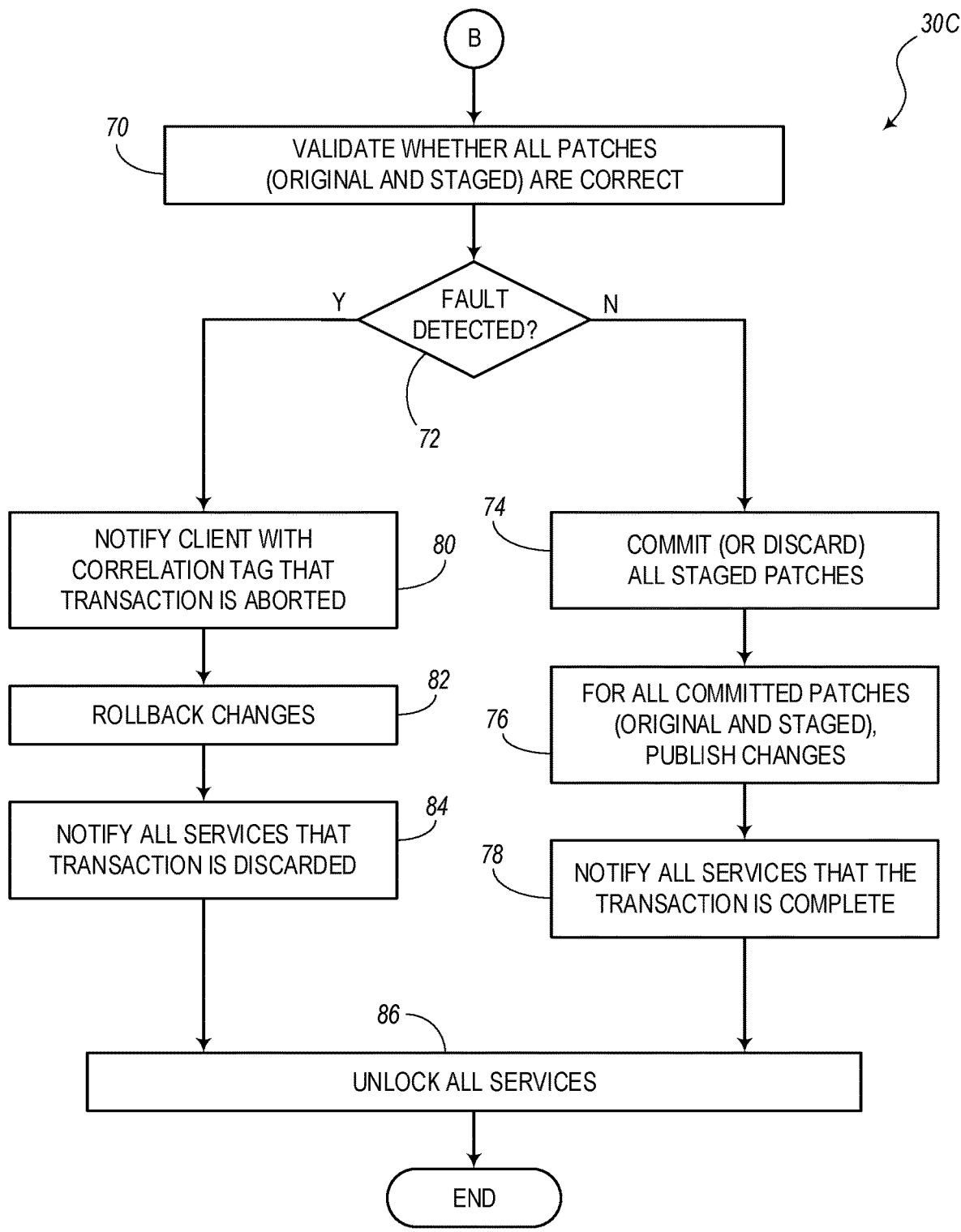

FIGS. 2A-2C show a process 30 for accelerating a transaction in a network, such as a distributed microservice optical network. The process 30 is made up of the combination of part 30A of FIG. 2A, part 30B of FIG. 2B, and part 30C of FIG. 2C. The process 30 includes obtaining, from one of the services associated with the network, a transaction to be processed in the network, as indicated in block 32. The process 30 also includes locking the services, as indicated in block 34. In decision block 36, it is determined whether or not the transaction is received from a trusted source. For example, according to one embodiment, determining trust may include checking a specific argument in the transaction that signals trust. If it is determined that the transaction has not been received from a trusted source, then "normal processing" of the transaction (e.g., the first transaction process) can be enacted. Otherwise, if the transaction comes from a trusted source, the process 30 proceeds to block 38 to allow the transaction processing according to the preferred embodiments of the present disclosure (e.g., second, third, and/or fourth transaction processes). Block 38 includes the step of committing the changes associated with the transaction. In this respect, it should be noted that this "commit" step is perform immediately after determining that the transaction has been received from a trusted source to thereby enable accelerated processing of the transaction throughout the network.

Process 30 also includes a step of getting "undo" patches, as indicated in block 40. The undo patches may be used in the situation where a fault is determined at a later time and the process 30 can rollback any changes to undo any steps that are taken based on the assumption that the transaction from the trusted source is a valid transaction. The "undo" step may include logging or tracking changes in order that notification can be provided to the client that they need to rollback changes in the low probability occurrence that the steps of the transaction are invalid.

Also, the process 30 further includes determining whether or not the transaction is an asynchronous transaction, as indicated in decision block 42. If the transaction is synchronous, the process 30 skips ahead to the steps shown part 30B of FIG. 2B. However, if the transaction is indeed asynchronous, then the process 30 includes returning true with correlation tag for transaction to be used if a rollback occurs, as indicated in block 44, and then starting a new thread to continue processing while the services are locked, as indicated in block 46.

As shown in the next part (i.e., 30B) of FIG. 2B, the process 30 includes getting a current state, as indicated in block 50. The process 30 also includes locally applying undo changes to the current state to determine a "source," as indicated in block 52. The process 30 further includes generating patches needed to go from a source state to the current state, as indicated in block 54. Block 56 includes the step of staging the patches recursively to allow services to add data to the transaction to change the state of the network.

The process 30 further includes, for staged data, the step of locking newly introduced services, as indicated in block 58. Block 60 includes getting the current state for these newly introduced services. The process 30 also includes applying staged patches with original changes, as indicated in block 62. Decision block 64 includes determining whether or not additional new results are found. If so, the process 30 loops back to block 58 for acting on the new results. If not, the process 30 proceeds to block 70 shown in FIG. 2C.

As shown in the next part (i.e., 30C) of FIG. 2C, the process 30 includes the step of validating whether all patches (original and staged) are correct, as indicated in block 70. The process 30 also includes determining if an error or fault is detected, as indicated in decision block 72. Since a fault will normally be relatively rare, given that the transaction is received from a trusted source, the process 30 will normally determine that no fault is detected and the path of the right column in FIG. 2C will be executed. However, in the event that a fault is detected in decision block 72, the left column in FIG. 2C is executed.

When no fault is detected (e.g., which is to be expected the majority of the time), the process 30 includes committing (or discarding) all the staged patches, as indicated in block 74. The process 30 also includes, for all committed patches (original and staged), publishing the changes, as indicated in block 76. Also, the process 30 performs the step of notifying all the services that the transaction is complete, as indicated in block 78, and then proceeds to block 86.

When a fault is detected by the decision block 72, the process 30 includes notifying the client with a correlation tag that the transaction is aborted or discarded, as indicated in block 80. The process 30 also includes rolling back changes, as indicated in block 82. Rolling back changes may also be referred to performing undo actions. Also, with an error detected, the process 30 performs the step of notifying all services that the transaction is discarded, as indicated in block 84, and then proceeding to block 86. In block 86, the process 30 includes unlocking all the services, at which point the process 30 ends.

Figure 3:
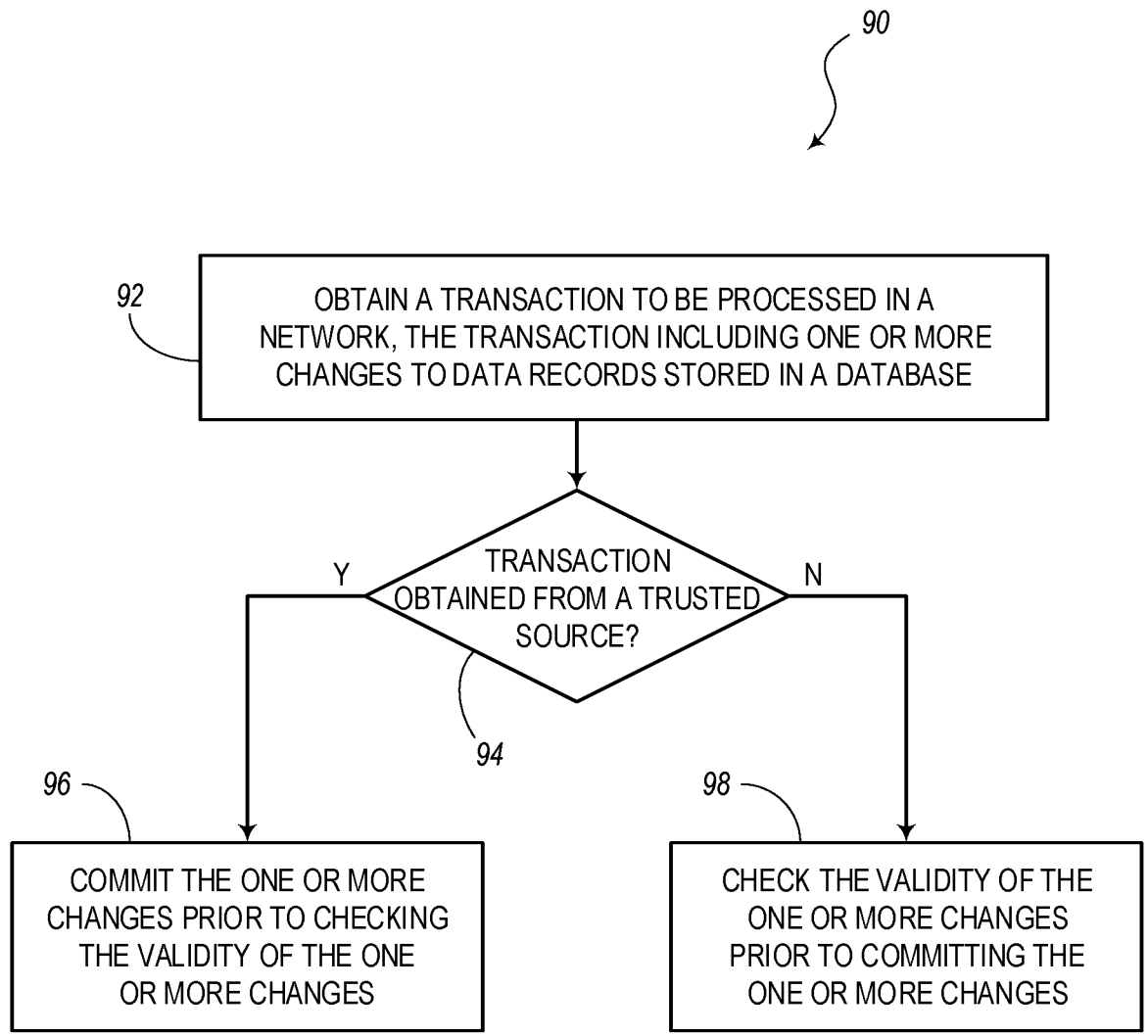
FIG. 3 is a flow diagram illustrating a process for accelerating transactions from a trusted source, according to various embodiments.

FIG. 3 is a flow diagram illustrating a general process 90 for handling a transaction. In this embodiment, the process 90 includes obtaining a transaction to be processed in a network, as indicated in block 92. The transaction may include one or more changes to data records stored in a database. The process 90 also includes determining whether the transaction is obtained from a trusted source, as indicated in decision block 94, wherein the trusted source may be predefined as a device that knows the state of components in the network. When it is determined in block 94 that the transaction is obtained from the trusted source, the process 90 proceeds to block 96, which includes the step of committing the one or more changes prior to checking validity of the one or more changes. However, when it is determined that the transaction is not obtained from the trusted source, the process 90 includes the step of checking the validity of the one or more changes prior to committing the one or more changes, as indicated in block 98.

The process (e.g., process 30, 90) may further comprise the step of staging patches subsequent to the step of committing the one or more changes. For example, staging patches allows services to add additional data records to the transaction to change the state of the network. Also, the process may include the step of getting undo patches subsequent to the step of committing the one or more changes and prior to the step of staging the patches. The undo patches may be configured to undo phases of the transaction to restore the state of the network prior to committing the one or more changes.

Also, the process may include the step of checking the validity of the one or more changes, whereby the step of checking the validity of the one or more changes may include detecting whether the transaction include an error. Responsive to detecting an error in the transaction, the process may further include the step of rolling back the one or more changes. Furthermore, the process may include the steps of discarding the transaction, notifying a client with a correlation tag that the transaction is discarded, and notifying one or more related services that the transaction is discarded.

The process (e.g., process 30, 90) may also include the step of locking a service associated with the transaction prior to the step of committing the one or more changes when the transaction is from the trusted source. Upon determining that the transaction is an asynchronous transaction, the process may include the steps of returning true with a correlation tag to be used for the transaction if a rollback occurs and starting a new thread to continue processing while the service is locked. At the end, the process may include the step of unlocking the service after the transaction is completed or discarded.

The embodiments of the present disclosure are configured to solve an efficiency problem with the execution of transactions in a network. In a microservice-based architecture, there may be many services that are able to participate in a transaction. If one entity wants to modify a client's data and the client does all the validation, then the client can control the process effectively. However, a client does not have control over what entity is going to validate data in other cases. Also, other services could register to validate a transaction against the client's data. For example, if one entity deletes a resource, this action may be fine from the perspective of the client since they might not know the entity deleting the resource. Other services might need to invoke a validation function to indicate that a resource is not allowed to be deleted, because, for instance, it may be a resource used by another service.

Resources may be handled monolithically. In other words, the way in which resources are handled may be determined upfront, such that every entity abides by the same rules. In this respect, the client has control over where validations are run and how best to engineer validations. Then, when a transaction is being processed, the policies engineered upfront can be used in a systematic way. However, a client may have less control over how resources are handled in a network having a distributed microservice architecture. Normally, in such a distributed network, transactions can only be processed so quickly because the policies are applied to all entities. In a normal processing routine, the transaction is validated first and then it can eventually be committed.

In a different deployment, where a service is far away and has a high latency for messaging or there are multiple services that want to validate something, the pre-existing policies can require multiple steps that will essentially slow things down in the conventional systems. For example, when performing a restoration of a path in an Optical Signaling and Routing Protocol (OSRP), control plane restoration, or other routing or restoration processes, multiple processes for each transaction are required.

According to another example, there may be another layer (e.g., control plane) that runs above the network layer and has a separate view of the data that is relevant to a service. There may be a service that goes through a number of nodes, whereby the control plane will have full visibility of those nodes. The control plane may be able to determine what provisioned transactions are valid by making sure that the transactions are not going to make a request that violates any of the system policies. When a user makes a request, the code on the system may invoke the control plane to determine whether the service is valid, whether it does not violate any conditions, whether there is no overlap, and whether it is not using resources that it should not be using. However, since the control plane, in many cases, has already done all this work before, it would not be asking for something that it knows is not valid because of its full view of the data. If the control plane knows that the request for a transaction comes from a trusted source, then the transaction may be referred to as a "trusted transaction."

Basically, the higher level control plane will know enough about the validation rules in the network system that it will not ask for something unless it is almost 100% guaranteed to be valid from a configuration point of view. The transaction may run in an original path or backup path, where, in a normal case, a success path may not have a catastrophic failure.

From the perspective of a control plane, it is desirable to execute transactions as quickly as possible. However, if the control plane were to invoke all the typical validation functions, it would take a longer time, and would slow down any restoration functions. As long as a restoration is down and service traffic is interrupted for customers, the customers will typically be dissatisfied. Therefore, the embodiments of the present disclosure are configured to speed up the process, such as by allowing the control plane (e.g., Multi-Protocol Label Switching (MPLS) device) to communicate to the nodes of the systems that paths have already been computed and that it can be trusted. By establishing that this device is a trusted source and it is requesting a trusted transaction, the processes of accelerating the transactions, as described in the present disclosure, may be enacted.

Essentially, the control plane may communicate to the network nodes to "just trust me" because it already knows about the transaction and it knows at least as much about the transaction than any other node in the system. Thus, when coming from the trusted source, the transaction can be executed with some of its steps rearranged, as described in the present disclosure, for accelerated processing. However, it is not communicating that the nodes should not validate the commands, but instead it is communicating that it is a trustworthy source (for most cases). Thus, it is relatively safe to assume that this "all-seeing, all-knowing" control plane can usually be trusted in most cases and the accelerated processes may be performed. Then, the network devices can speed up the process by assuming that the control plane is valid and perform a "commit" step prior to other steps, such as the step of validating. Therefore, with the trusted transaction, the order of the commit and validate steps are reversed.

Usually what happens with typical transactions is that a network device finds all the services involved and additional data can be added in a "staging" step. The data is compared with other occurrences in a difference step (e.g., also referred to a "diff" step) against the whole system to find other devices that may be interested in all the changes. At this time in the conventional process, the device asks the other devices to validate. Then, after all the devices have communicated back to the source device (e.g., in serial messaging), the source device can tell the other devices to commit (or discard if it is an invalid transaction). These conventional processes, of course, can be time-consuming. Thus, the accelerated procedure described herein is capable of expediting transactions by postponing this time-consuming validation process to allow the system to move along with its normal processing and validating later.

The diff process may include a data comparison tool that computes and displays the differences between the contents of two files. The diff process may include identifying a set of changes (e.g., deletions, insertions, or other actions) that may be used to create one file from the other. This set of changes may be used, if needed, for a "patching" step. The terms "diff" and "patch" in some cases may be used interchangeably.

When a device receives a "trusted transaction" from a "trusted source," the device will automatically commit the changes of this transaction. Also, it may receive rollback instructions that the device would need to undo the changes in the transaction, if necessary. In some embodiments, each service may be responsible for committing the transaction changes and recording the rollback or undo procedures. In some cases, a trusted source might ask for a change that is already there and this transaction might be a no-op. The devices will then need to know how to roll this transaction back the fastest way possible. The devices do the commit step as fast as possible, but then, if the trusted source report backs that there is an error, the devices are configured to execute the rollback or undo procedures.

According to another example, a device (hardware) of the network may already be in the process of reconfiguring to enact the changes that the control plane has requested. After the commit step has been processed, the device may then ask other devices in the network if the applied change was a valid configuration. The majority of the time, the other devices will respond in the affirmative. The devices can then continue to carry on and essentially pretend like nothing ever happened. The commit was applied early in the process, more quickly than conventional transactions, and the network benefits by operating more quickly and customers are happy.

In some cases, though, one or more resources may have died or there is some other failure elsewhere in the network. With the fault case, one or more of the network devices may recognized that the transaction is invalid (or was initially valid but is no longer valid). For example, a transaction may have been valid when the control plane thought it was valid, but conditions might have changed between the initial request and the actual implementation in the hardware. This is where the undo comes into play. When a device in the validation phase realizes that the transaction initiated by the control plane is invalid. In response to detection of such an invalidity, the system may automatically rollback by applying those undo changes to get the system back to the state where it was before. A notification is then be sent to all the devices (clients) that the transaction it just asked for is now not valid anymore.

The embodiments may be implemented in a network environment, such as a distributed optical network. In this environment, there may be a layer (e.g., control layer) on top of a network layer that may be considered to be a trusted entity. In this context, the control plane may normally be reliable close to 100% of the time, where the network elements can run normally without interruption. However, with the occasional error, the system can back up and perform the undo procedures to rollback the system to an earlier stable time. Since the rollback is rarely needed, the system can benefit from faster operating times for most of the time.

Examples of other environments may also be considered in which an accelerated processing plan is enacted. Some services may include a Yang file (e.g., a schema) that may be configured to determine what valid transaction can be sent, what are the valid ranges, what are the valid values for given strings, etc. In many cases, the schema itself, which is a published contract between a service and a client, will be agreed upon by both sides. A transaction can be viewed as valid if it conforms to the shared contract. This allows the implementation of the accelerated transaction processing by the act of bypassing validation steps. Then, the all-knowing, all-seeing service (e.g., server, NMS, controller, etc.) outside of the device, which would have a better view (or at least an equivalent view) of the system, may then communicate to the other devices that it has pre-validated some transaction before and one of these transaction may be requested with the potential for accelerated processing.

In another example, a user may be configured to enter commands on a Command Line Interface (CLI), but may accidentally make a typographical error (e.g., typing the number "200" instead of "20"). In this case, the embodiments of the present disclosure may further include a validity device for checking that entries are within certain acceptable ranges. The system may have a requestor device that drive a transaction. The validity device may be configured to make sure that what the requestor device is requesting fits the constraints of what is in the service/client contract. It knows that it would not request something outside of a certain range. With the validity device catching mistakes upfront, the requestor device may still be considered as a trusted source providing a trusted transaction and maintain its trustworthiness. Again, it can indicate to other devices that it has done the validation in advance for the details of the schema.

Some steps may be easy validation steps to skip because they may just be Yang validations. However, there might be some other more complicated steps to skip that may have different levels of validation. For example, it is plausible to include additional processing to determine various levels of trust. It may be possible that a trusted source provides a trusted schema, because it knows that it is conforming to the schema. However, the system may still be configured to validate the semantics, so that it does not create something that the schema does not know about, but the system might want to reject for whatever reason.

From a software perspective, a control plane of an NMS may have a different software architecture than the network element software in the system, but they may both be controlled by the same messaging layer. It may not matter what software architecture is employed, as long as the system has an API that allows a device to establish itself as a trusted source. Establishing trusted devices may be an action that is driven by the device layer. Otherwise, if a device that should be trusted (e.g., an NMS) requests a transaction, if it is not recognized by other devices as a trusted source or does not respect that level of trust, then the accelerated processing may not be performed.

It should be understood that the commit step may include putting a transaction request into persistent store and essentially move it down into the hardware layer. The commit flow may look like a normal post-validate commit flow, because the other downstream services would not know the difference between a pre-commit from a trusted transaction and a normal commit. The transaction is put into a database and the other devices are notified that the transaction has been committed. The downstream devices are informed of the committed transaction and the processes flow as if it has already been validated.

In the context of a recovery path of an optical network, the control plane may request turning on or enabling the alternate path. The commit step may be enacted, but the traffic may not go through until all the commit process end-to-end is done. In the process, for example, an error may be detected and the system may need to undo steps from the point of the early (accelerated) commit step.

In some situations with a control plane, the rollbacks may be needed reasonably often. The control plane may be built to be immune to these sorts of commit failures and may not have any guarantee of the level of sophistication of the software underneath it. As such, there may be many times where it asks to perform a transaction and the system thinks it will work properly, but then it may realize that it did not have enough information before and will need to rollback.

Although a control plane may be configured to perform the accelerated process and know how to rollback when needed, other devices on the network (associated with other vendors or other clients) may not be configured to handle these sorts of rollbacks when an error occurs. Although this might hinder the integration of the acceleration processing into a system, it may be deployed in stages as new equipment is introduced into the system or as equipment is modified to handle the accelerated processing described in the present disclosure. Also, when a client claims to be a trusted source, there may be an added burden on the client to be able to handle certain cases where that trust was broken. This may be addressed in a number of ways, such as by recording the amount of time saved by the accelerated process during normal conditions and providing these figures to customers to show that the saved time is greater than the time needed to handle the seldom errors and rollbacks.

The control plane (e.g., service, collection of services, etc.) may already be configured to manage cases where trust is broken and may therefore be considered to preferably be the first device to be integrated into the accelerated transaction processing system, mainly because it may already know how to do rollbacks or crank-backs. Other services or devices may also be considered for integration, which may include adding the functionality of handling notifications to inform network elements that each device need to back up a certain number of steps since the transaction has been identified as invalid.

As the all-knowing, all-seeing service (e.g., control plane, NMS, etc.), the trusted source may simply tell other devices what to do. Without question, each device is configured to respond quickly as if validation has already taken place. In this way, it is possible to temporarily bypass or defer validation for the sake of speed in order to process requests as quickly as possible.

The acceleration processing of the present disclosure is able to achieve the fast execution because the novel arrangement of steps, as described herein, allows devices to go ahead with the commit without having to wait for the validations to finish before the transaction is passed on to hardware. From the client perspective, this process is faster because the devices actually return that synchronous call sooner, and the rest of the validation is only an asynchronous notification in the case when a fault is detected. To the client, the process will operate faster, but then occasionally (e.g., one out of thousands/millions of times), there may be a notification that the transaction did not work and needs to be handled. Of course, the success path (which most likely happens much more often) will almost always be faster.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions enabling a processing device to:

obtain a transaction to be processed in a network, the transaction including one or more changes to data records stored in a database;

determine whether the transaction is obtained from a trusted source, wherein the trusted source is predefined as a device including a client, node, or service that reliably knows the state of components in the network, and wherein the trusted source signals in the transaction that it is trusted;

when the transaction is obtained from the trusted source, commit the one or more changes prior to checking validity of the one or more changes and continue to check the validity of the one or more changes with an option to undo if the one or more changes are invalid; and when the transaction is not obtained from the trusted source, checking the validity of the one or more changes prior to committing the one or more changes.

2. The non-transitory computer-readable medium of claim 1, wherein the instructions further enable the processing device to stage patches subsequent to committing the one or more changes, wherein staging patches allows services to add additional data records to the transaction to change the state of the network.

3. The non-transitory computer-readable medium of claim 2, wherein the instructions further enable the processing device to get undo patches subsequent to committing the one or more changes and prior to staging the patches, wherein the undo patches are configured to undo phases of the transaction to restore the state of the network prior to committing the one or more changes.

4. The non-transitory computer-readable medium of claim 1, wherein the instructions further enable the processing device to check the validity of the one or more changes, wherein checking the validity of the one or more changes includes detecting whether the transaction includes an error.

5. The non-transitory computer-readable medium of claim 4, wherein, responsive to detecting an error in the transaction, the instructions further enable the processing device to rollback the one or more changes.

6. The non-transitory computer-readable medium of claim 5, wherein the instructions further enable the processing device to:
discard the transaction;
notify a client with a correlation tag that the transaction is discarded; and
notify one or more related services that the transaction is discarded.

7. The non-transitory computer-readable medium of claim 1, wherein the instructions further enable the processing device to lock a service associated with the transaction prior to committing the one or more changes when the transaction is from the trusted source, and wherein, upon determining that the transaction is an asynchronous transaction, the instructions further enable the processing device to:
return true with a correlation tag to be used for the transaction if a rollback occurs; and
start a new thread to continue processing while the service is locked.

8. A method comprising the steps of:
obtaining a transaction to be processed in a network, the transaction including one or more changes to data records stored in a database;
determining whether the transaction is obtained from a trusted source, wherein the trusted source is predefined as a device including a client, node, or service that reliably knows the state of components in the network, and wherein the trusted source signals in the transaction that it is trusted;
when the transaction is obtained from the trusted source, committing the one or more changes prior to checking validity of the one or more changes and continuing to check the validity of the one or more changes with an option to undo if the one or more changes are invalid; and
when the transaction is not obtained from the trusted source, checking the validity of the one or more changes prior to committing the one or more changes.

9. The method of claim 8, further comprising the step of staging patches subsequent to the step of committing the one or more changes, wherein staging patches allows services to add additional data records to the transaction to change the state of the network.

10. The method of claim 9, further comprising the step of getting undo patches subsequent to the step of committing the one or more changes and prior to the step of staging the patches, wherein the undo patches are configured to undo phases of the transaction to restore the state of the network prior to committing the one or more changes.

11. The method of claim 8, further comprising the step of checking the validity of the one or more changes, wherein checking the validity of the one or more changes includes detecting whether the transaction includes an error.

12. The method of claim 11, wherein, responsive to detecting an error in the transaction, the method further includes the step of rolling back the one or more changes.

13. The method of claim 12, further comprising the steps of:
discarding the transaction;
notifying a client with a correlation tag that the transaction is discarded; and
notifying one or more related services that the transaction is discarded.

14. The method of claim 8, further comprising the step of locking a service associated with the transaction prior to the step of committing the one or more changes, when the transaction is from the trusted source.

15. The method of claim 14, wherein, upon determining that the transaction is an asynchronous transaction, the method further comprises the steps of:
returning true with a correlation tag to be used for the transaction if a rollback occurs; and
starting a new thread to continue processing while the service is locked.

16. The method of claim 15, further comprising the step of unlocking the service after the transaction is completed or discarded.

17. A system comprising:
a processing device; and
a memory device configured to store a computer program having instructions that, when executed, cause the processing device to:
obtain a transaction to be processed in a network, the transaction including one or more changes to records stored in a database;
determine whether the transaction is obtained from a trusted source, wherein the trusted source is predefined as a device including a client, node, or service that reliably knows the state of components in the network, and wherein the trusted source signals in the transaction that it is trusted;
when the transaction is obtained from the trusted source, commit the one or more changes prior to checking validity of the one or more changes and continue to check the validity of the one or more changes with an option to undo if the one or more changes are invalid; and when the transaction is not obtained from the trusted source, check the validity of the one or more changes prior to committing the one or more changes.

18. The system of claim 17, wherein the instructions, when executed, further cause the processing device to:
   stage patches subsequent to committing the one or more changes, wherein staging patches allows services to add additional data records to the transaction to change the state of the network; and
   get undo patches subsequent to committing the one or more changes and prior to the step of staging the patches, wherein the undo patches are configured to undo phases of the transaction to restore the state of the network prior to committing the one or more changes.

19. The system of claim 17, wherein, responsive to detecting an error in the transaction when the transaction is obtained from the trusted source, the instructions, when executed, further cause the processing device to:
   roll back the one or more changes;
   discard the transaction;
   notify a client with a correlation tag that the transaction is discarded; and
   notify one or more related services that the transaction is discarded.

20. The system of claim 17, wherein the instructions, when executed, further cause the processing device to:
   lock a service associated with the transaction prior to committing the one or more changes; and
   unlock the service after the transaction is completed or discarded.

* * * * *